United States Patent
Broussard

(10) Patent No.: US 7,297,035 B2
(45) Date of Patent: *Nov. 20, 2007

(54) MARINE CRAFT ADAPTED FOR SHALLOW WATER OPERATION

(75) Inventor: Kyle Broussard, Loreauville, LA (US)

(73) Assignee: Gator Tail, L.L.C., Loreauville, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/419,669

(22) Filed: May 22, 2006

(65) Prior Publication Data

US 2006/0199451 A1    Sep. 7, 2006

Related U.S. Application Data

(63) Continuation of application No. 10/844,192, filed on May 11, 2004, now Pat. No. 7,048,600, and a continuation-in-part of application No. 10/844,192, filed on May 11, 2004, now Pat. No. 7,048,600, which is a continuation-in-part of application No. 10/662,487, filed on Sep. 15, 2003, now Pat. No. 7,052,340.

(60) Provisional application No. 60/411,701, filed on Sep. 17, 2002.

(51) Int. Cl.
*B63H 20/14* (2006.01)
(52) U.S. Cl. ....................................... 440/75
(58) Field of Classification Search .................. 440/49, 440/53, 63, 65, 75, 76, 900; 248/640, 641, 248/642, 643
See application file for complete search history.

(56) References Cited

U.S. PATENT DOCUMENTS

| 941,827 A | 11/1909 | Trouche |
|---|---|---|
| 1,789,415 A | 1/1931 | Phillips |
| 1,953,599 A | 4/1934 | Grimes |
| 2,096,223 A | 10/1937 | Chandler et al. |
| 2,096,457 A | 10/1937 | Irgens |

(Continued)

FOREIGN PATENT DOCUMENTS

JP        4368295        12/1992

(Continued)

OTHER PUBLICATIONS

Mud Buddy Outdoors Web Site; Copyright 2004; Mud Buddy Hyperdrive, Latest News & Info; 3 pages.

(Continued)

*Primary Examiner*—Lars A. Olson
(74) *Attorney, Agent, or Firm*—Sieberth & Patty, L.L.C.

(57) ABSTRACT

A marine craft which includes a portable drive assembly temporarily attached to the transom, the portable drive assembly including an elongated drive housing enclosing an upper drive assembly and a lower driven assembly and a timing belt connecting the upper drive assembly to the lower driven assembly. The craft further includes an engine mounting plate attached externally to the drive housing adjacent the upper drive assembly perpendicular to the drive housing. The lower driven assembly also has a propeller shaft at least a portion of which is enclosed within a shaft housing attached to the drive housing adjacent the driven assembly, the shaft housing extending in excess of 18 inches beyond the drive housing, and a propeller attached to the propeller shaft.

16 Claims, 12 Drawing Sheets

U.S. PATENT DOCUMENTS

| | | |
|---|---|---|
| 2,475,115 A | 7/1949 | Van Eaton |
| 2,722,193 A | 11/1955 | Brindley |
| 2,856,883 A | 10/1958 | Baker |
| 2,996,035 A | 8/1961 | Torrey |
| 3,269,351 A | 8/1966 | Shimanckas |
| 3,269,357 A | 8/1966 | Shimanckas |
| 3,752,111 A | 8/1973 | Meynier, Jr. |
| D259,119 S | 5/1981 | Quan |
| D259,488 S | 6/1981 | Carter et al. |
| 4,645,463 A | 2/1987 | Arneson |
| 4,726,796 A | 2/1988 | Rivette, Jr. et al. |
| 4,869,692 A | 9/1989 | Newman |
| 4,992,066 A | 2/1991 | Watson |
| 5,032,094 A | 7/1991 | Katogi |
| 5,178,566 A | 1/1993 | Stojkov et al. |
| 5,336,119 A | 8/1994 | Lais et al. |
| 5,415,576 A | 5/1995 | Meisenburg et al. |
| 5,435,763 A | 7/1995 | Pignata |
| 5,722,866 A | 3/1998 | Brandt |
| 5,989,085 A | 11/1999 | Suzuki |
| 6,183,320 B1 | 2/2001 | Natsume |
| 6,302,750 B1 | 10/2001 | Foreman |
| 6,361,388 B2 | 3/2002 | Foreman |
| 6,468,120 B1 | 10/2002 | Hasl et al. |
| 6,682,374 B2 | 1/2004 | Kokubo |
| 7,048,600 B1 * | 5/2006 | Broussard .................... 440/53 |
| 7,052,340 B1 * | 5/2006 | Broussard .................... 440/75 |

FOREIGN PATENT DOCUMENTS

| | | |
|---|---|---|
| JP | 5039088 | 2/1993 |

OTHER PUBLICATIONS

Mud Buddy Outdoors Web Site; Copyright 2004; HyperDrive Motors; 2 pages.

Mud Buddy Outdoors Web Site; Copyright 2004; Q & A's, Electric Tilt and Trim Added to HyperDrive May 3, 2004; 4 pages.

Mud Buddy Outdoors Web Site; Copyright 2004; Hyper News Announcement, A New Generation of High Performance Mud Buddy . . . ; 7 pages.

Arthur Unknown; "Bog Hog Long Tail Motors and Kits"; website http://www.boghogmudmotors.com/longtail.php visited Sep. 14, 2006; 2 pages.

Arthur Unknown; "Bog Hog Mud Motor Features & Benefits"; website http://www.boghogmudmotors.com/features.php visited Sep. 14, 2006; 1 page.

Arthur Unknown; "Bog Hog Mud Motor Frequently Asked Questions"; website http://www.boghogmudmotors.com/faq.php visited Sep. 14, 2006; 2 pages.

Arthur Unknown; "Bog Hog Mud Motor Short Tail Mud Motors and Kits"; website http://www.boghogmudmotors.com/shorttail.php visited Sep. 14, 2006; 5 pages.

* cited by examiner

MARINE CRAFT ADAPTED FOR SHALLOW WATER OPERATION

REFERENCE TO RELATED APPLICATIONS

This is a continuation or continuation-in-part of commonly owned and co-pending non-provisional application Ser. No. 10/844,192 filed May 4, 2004, now U.S. Pat. Ser. No. 7,048,600 issued May 23, 2006, and which is a continuation-in-part of application No. 10/662,487 filed Sep. 15, 2003, now U.S. Pat. Ser. No. 7,052,340 issued May 30, 2006, claiming priority to provisional application No. 60/411,701 filed Sep. 17, 2002. This is also a continuation or continuation-in-part of the aforesaid commonly owned and co-pending non-provisional application 10/662,487, now U.S. Pat. Ser. No. 7,052,340. All of the foregoing applications are fully incorporated herein by reference.

FIELD OF THE INVENTION

This invention relates generally to transom-mounted outboard motors for small marine watercraft and more particularly to air-cooled engines having belt driven propeller shafts for shallow draft watercraft.

GENERAL BACKGROUND

Small marine craft operating primarily in shallow water are often referred to as mud boats. Such boats are usually shallow draft flat bottom boats powered by in-board air cooled engines with outboard drives adapted to pass through the hull or transom for coupling to the engine, as disclosed by U.S. Pat. Nos. 941,827, 3,752,111 and 4,726,796.

In some cases small air cooled engines have been adapted for fixed attachment to a boat's transom for pivotal steering in the horizontal plane, with an extended drive shaft extending rearwardly to just below the water line at an angle of approximately 30 degrees as illustrated by Foreman in U.S. Pat. No. 6,302,750.

Other patents, such as Carter, et al. in U.S. Des. 259,488 illustrate the use of an air cooled engine pivotally mountable to the boat's transom with the same elongated drive shaft extending to just below the waterline perhaps at a somewhat greater angle, depending on the height of the transom. In most cases the drives are designed not to extend below the bottom of the hull.

Lais et al. and others disclose the use of electric motors in combination with a belt drive to maneuver small craft as is disclosed in U.S. Pat. Nos. 5,336,119 and 1,953,599. Obviously, such drives are not intended for high speed or for extended powering through mud or vegetation in shallow water.

The use of air cooled or water cooled marine engines coupled by belt to a transom mounted drive unit are well known within the art as being a most efficient means for driving a propeller shaft thereby reducing friction and improving mechanical advantage over right angle gear drives. Therefore, the use of a belt drive in combination with an air cooled engines as disclosed by Pignata in U.S. Pat. No. 5,435,763 seems to be an obvious choice. However, Pignata utilizes a unique internal propeller arrangement and with a through the transom coupling for an inboard air-cooled engine with pivotal kick-up capability or over the top of the transom arrangement. However, Pignata fails to fully disclose how either such arrangement may be steered effectively. While the Pignata apparatus may be useful in open water, it is far from obvious that it could be adapted for use in shallow water marsh with heavy mud and vegetation. The internal propeller housing must be located below the boat hull for water to be drawn effectively through the internal propeller blades. Therefore, if the propeller housing were above the bottom of the boat's hull, water flow would be blocked, Shallow draft boats are known to create a depression at speed for some distance directly behind the transom. It is therefore essential that the propeller shaft extend below the boat hull or beyond the water depression to make sufficient contact with the water to provide thrust and prevent cavitations.

Mud boats rely a great deal on propeller contact with the mud and the propeller's ability to cut the vegetation to help drive the boat. Hence the concept of having an elongated drive shaft extending at a shallow angle from above a boat's transom to just below the water surface has long been the excepted practice for mud boats. However, the use of a fixed inboard engine with a through transom coupling limits the apparatus to a particular boat and therefore may not be removed and mounted on another boat without extensive modifications. The use of a removable over the transom mounted air cooled engine with extended drive shaft is awkward and often limited to a relatively low horsepower engines. There is obviously a need to provide a relatively high horsepower air cooled engines adapted to an efficient belt drive for mounting to small, flat bottom boats in much the same manner as water cooled outboard engines. Such a driver must also be equipped with a foot that does not extend below the bottom of the boat but extends a sufficient distance behind the boat to insure the proper angle of attack when the propeller is in contact with mud and vegetation.

The use of a wide variety of commercially available air-cooled engines with 50 horsepower or more presents a wide range of problems that must be addressed and that are not encountered by conventionally manufactured outboard engine manufactures. By not manufacturing the engine, the drive must be adaptable to multiple engine configurations and drive train configurations. The weight of the engines must be considered and balanced in regard to the drive. Unique pivotal adjustments are necessary to insure safety and proper angles of attack at various speeds. The use of transmissions and clutches must also be considered in an attempt to reduce weight and cost. Conventional drives are inadequate due the constant inter-reaction with debris and mud including stumps and rocks. Therefore, consideration must be given to special propellers and their couplings when used as solids conveying means. Contact with underwater objects is a serious safety problem with mud boat drives since the engine can kick up or sideways causing serious harm to the operator.

It should be understood that a distinction should be made between air cooled engines utilizing a fully enclosed, self contained, circulating water system and water cooled marine engines that utilize the water in which they are submersed, for cooling. Some air cooled marine outboard engines have also been developed. However, for the purpose of this application air cooled engines used as an outboard drive are considered to be both air and self-contained water-cooled engines generally used for inboard drive engines or utility applications other than marine.

SUMMARY OF THE INVENTION

A relatively high horsepower air-cooled engine in one embodiment of this invention is adapted to an efficient belt drive assembly capable of being transom mounted to small flat bottom boats in much the same manner as conventional outboard engines. The drive is equipped with a lower drive shaft that does not extend below the bottom of the boat but extends a sufficient distance behind the boat to insure contact with the water for conventional propulsion. A unique pivotal arrangement allows the engine and drive assembly to be positioned for proper angle of attack when the propeller is in contact with mud and vegetation below the bottom of the boat. This arrangement allows for a much shorter turning radius than can be achieved by the related prior art transom mounted mud motor systems. The engine mount includes incremental tilt positioning capability and a pivotal horizontal steering handle. The propeller is capable of providing propulsion when in contact with solids such as mud and vegetation, and provides relatively fast hull speed in deep water. A clutch is provided to disengage the engine from the drive and an electric drive motor is provided in contact with the belt drive for turning the drive in a reverse direction.

The various embodiments and features of this invention will now become apparent from the following detailed description, the accompanying drawings and the appended claims.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
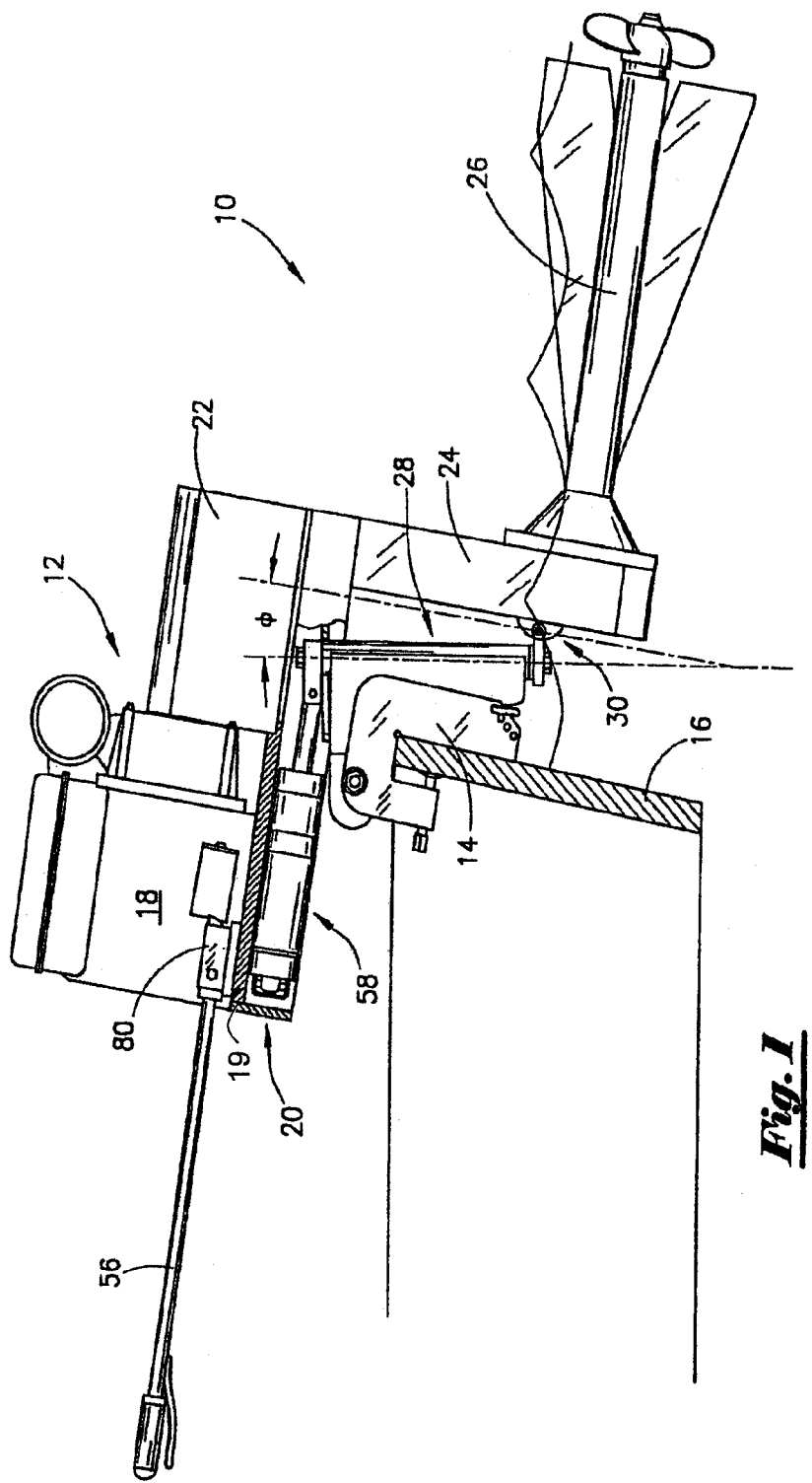
FIG. 1 is a side elevation view of the preferred embodiment in the conventional drive position.
Figure 2:
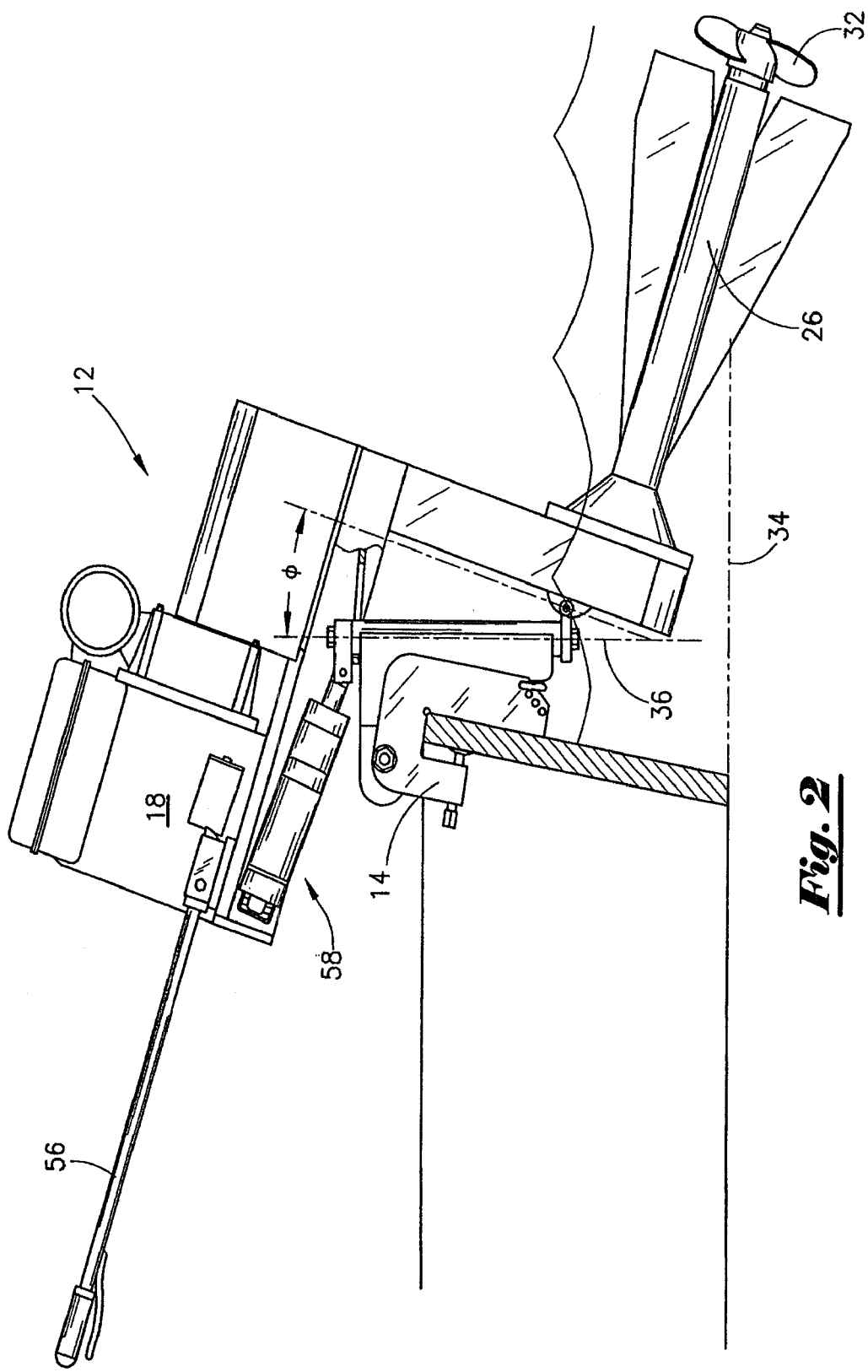
FIG. 2 is a side elevation view of the preferred embodiment in the mud engagement position.
Figure 3:
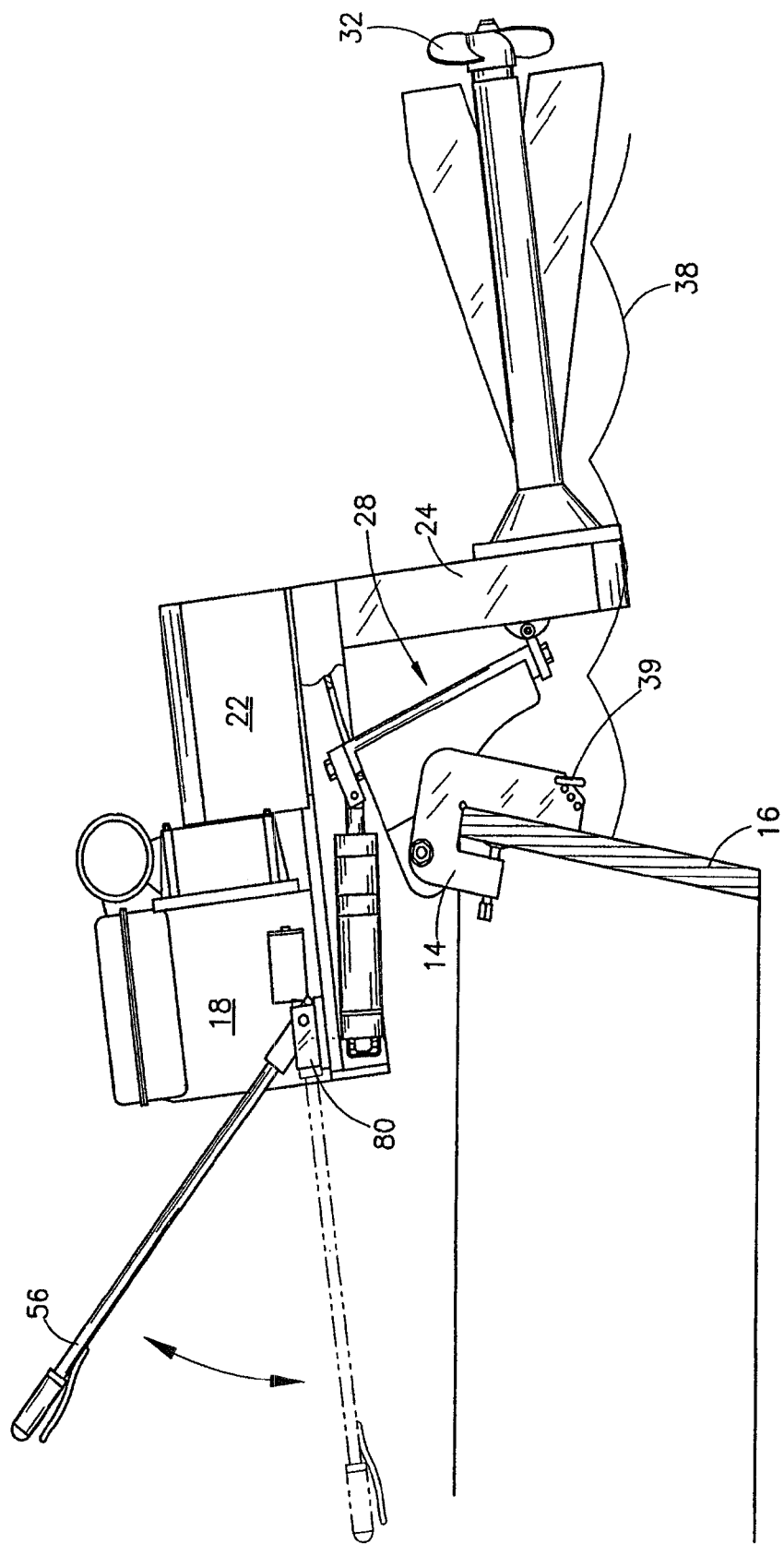
FIG. 3 is a side elevation view of the preferred embodiment in the tilt up position.

The preferred embodiment 10 of the portable outboard drive assembly 12 as shown in FIG. 1 utilizes a mounting bracket assembly comprising a conventional mounting bracket 14 for attaching the outboard drive assembly 12 to a boat's hull at transom 16. The drive assembly 12 consisting principally of any number of commercially available air-cooled or self-contained water cooled utility engine assemblies 18 adaptively mounted to the frame assembly 20 at engine mounting plate 19. The engines are connected by way of clutch and or transmission assemblies located within the transmission housing 22, to a timing belt and gear drive assembly, also referred to herein as the upper drive assembly and lower driven assembly, located within the elongated vertical housing 24, to which is connected the output drive shaft assembly located within the shaft housing 26 as previously discussed in at least our prior application Ser. No. 10/662,487, the disclosure of which is incorporated herein by reference. Shaft housing 26 extends in excess of 18 inches beyond vertical housing 24. The upper drive assembly and the lower driven assembly further include respective timing pulleys operatively connected to a timing belt unobstructed or acted upon by other bodies, the pulleys and belt together forming a timing belt drive gear, 104. In this case, the frame assembly 20 and vertical housing 24 are adaptively mounted in a pivotal and rotative manner to the pintle assembly 28. This allows the entire drive assembly 12 to be pivotal about the pin assembly 30 (also referenced herein as the "first pivoting assembly") located at the base of the pintle assembly 28 further disclosed in FIG. 10. This pivoting motion also allows the angle "Φ" of the drive assembly 12 to be increased relative to the pintle assembly 28 as shown in FIGS. 1 and 2, thus placing the propeller 32 below hull level 34, while still allowing the drive assembly 12 to be rotated about the central axis 36 of the pintle assemble 28. In addition the pintle assembly 28 can still be pivoted upwards positioning the propeller clear of the water 38 or at selected positions established by the pull pin 39 relative to the transom 16 as shown in FIG. 3.

Figure 4:
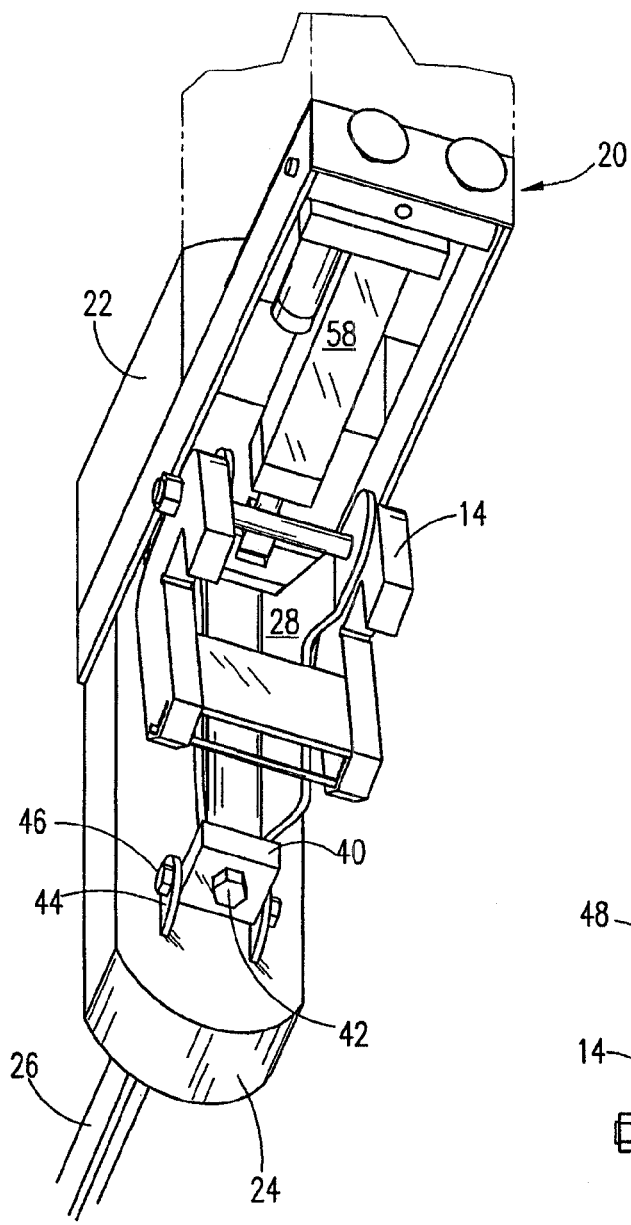
FIG. 4 is an isometric view of the underside of the preferred embodiment with rotary actuator.
Figure 10:
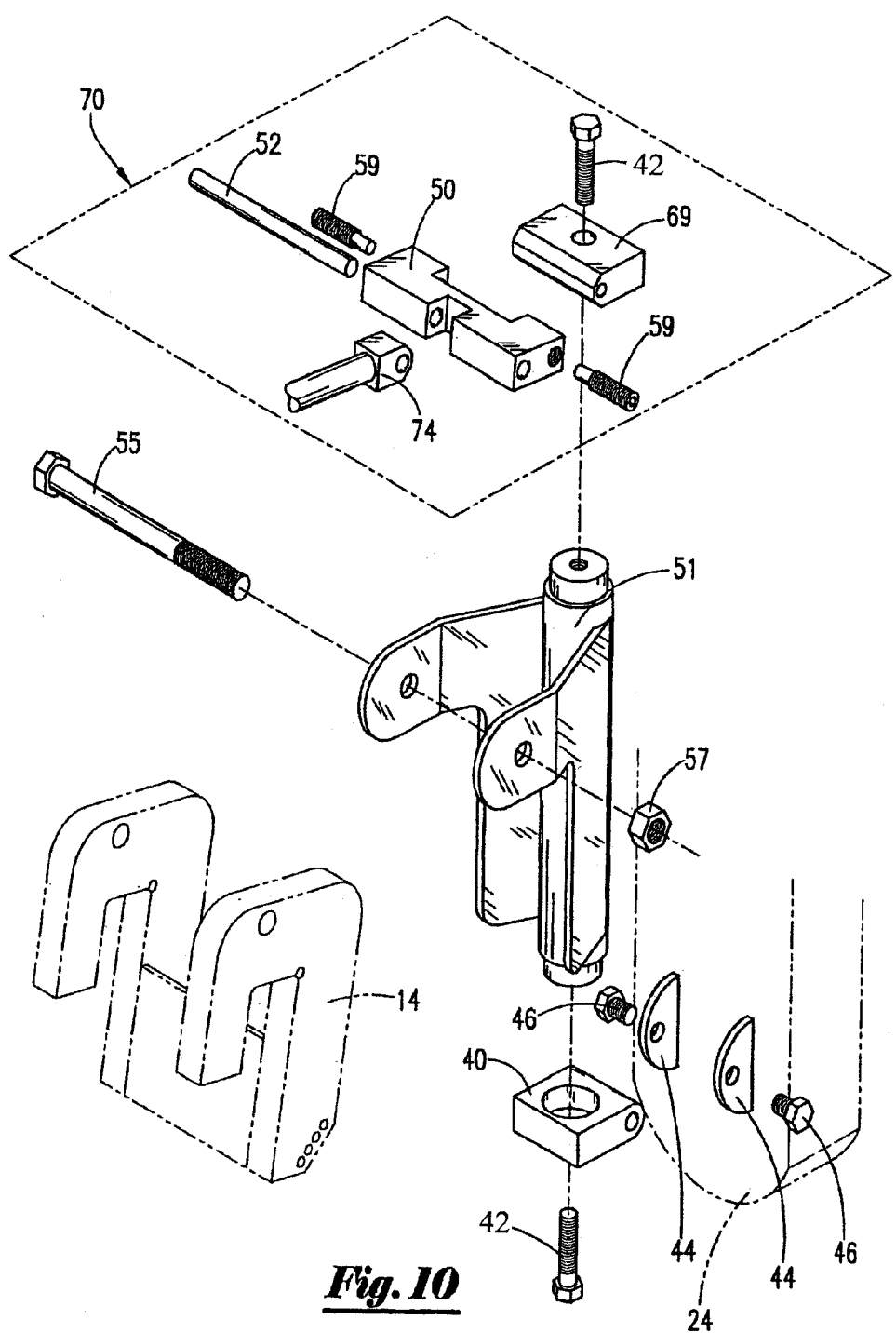
FIG. 10 is an exploded view of the pivotal assembly with actuator connection.

As seen in FIG. 4, and in greater detail in FIG. 10, the lower pintle pin assembly 30 utilizes a pivot block 40 secured to the pintle assembly 28, in a rotative manner about the rod 42 and is pivotally attached to the vertical housing 24 by a pair of clevis pad eyes 44 and a pivoting pin 46 passing through the pad eyes 44 and the block 40.

Figure 5:
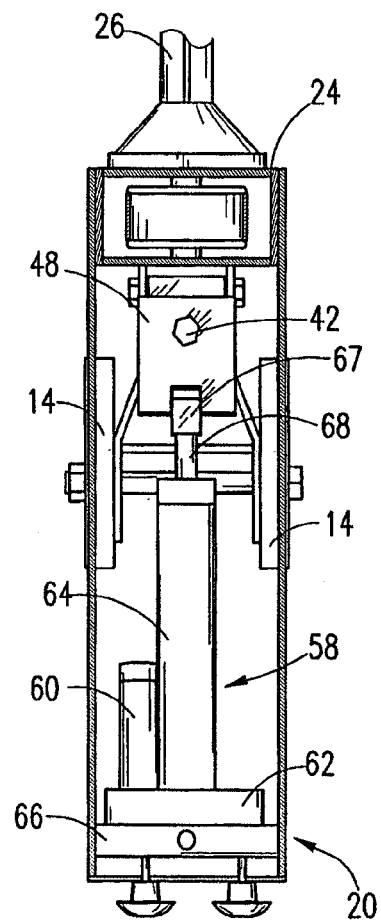
FIG. 5 is a partial cross section view of the underside of the preferred embodiment shown in FIG. 4.
Figures 8, 9:
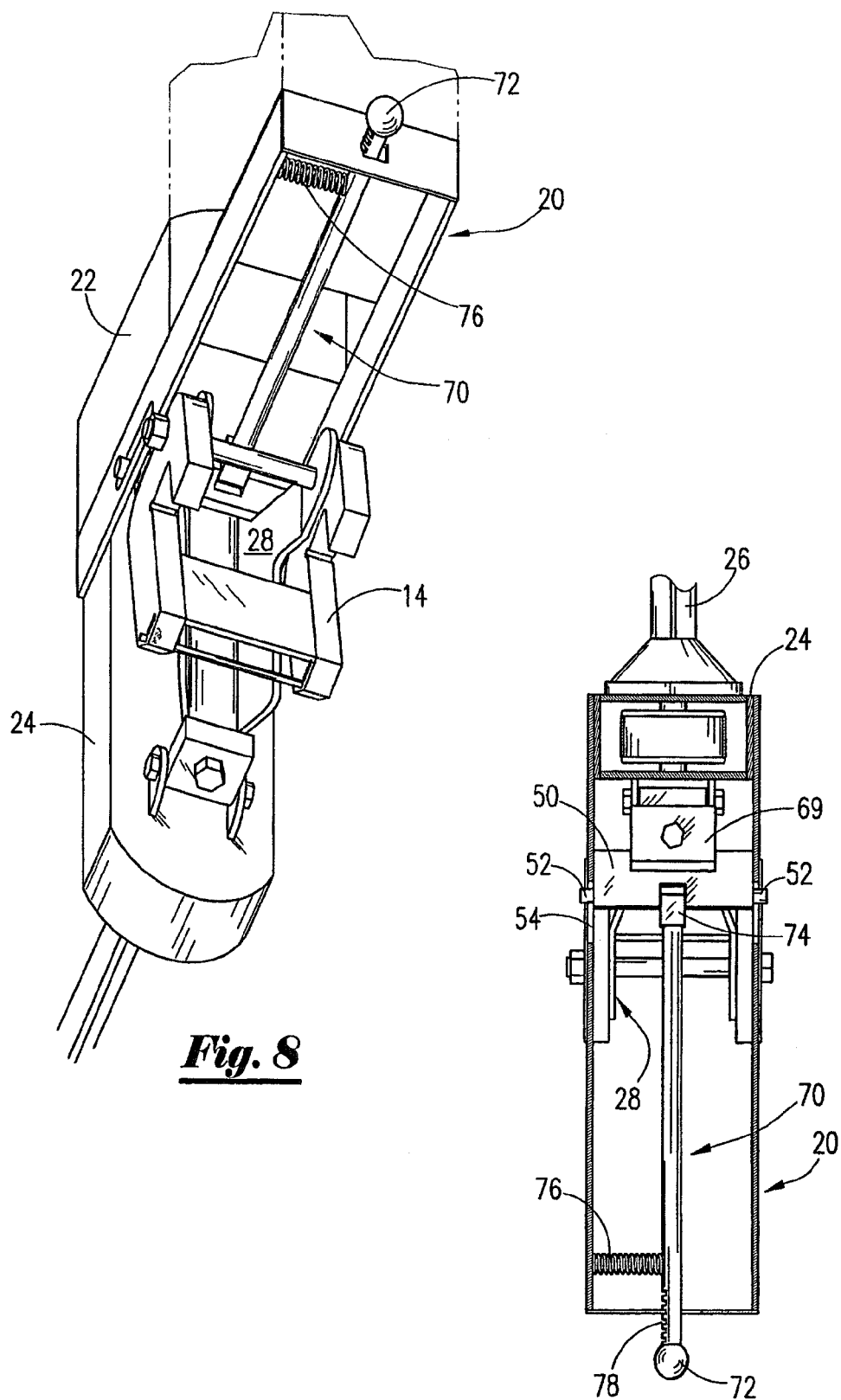
FIG. 8 is an isometric view of the underside of the embodiment with manual positioner.
FIG. 9 is a partial cross section view of the underside of the embodiment shown in FIG. 8.
Figure 10A:
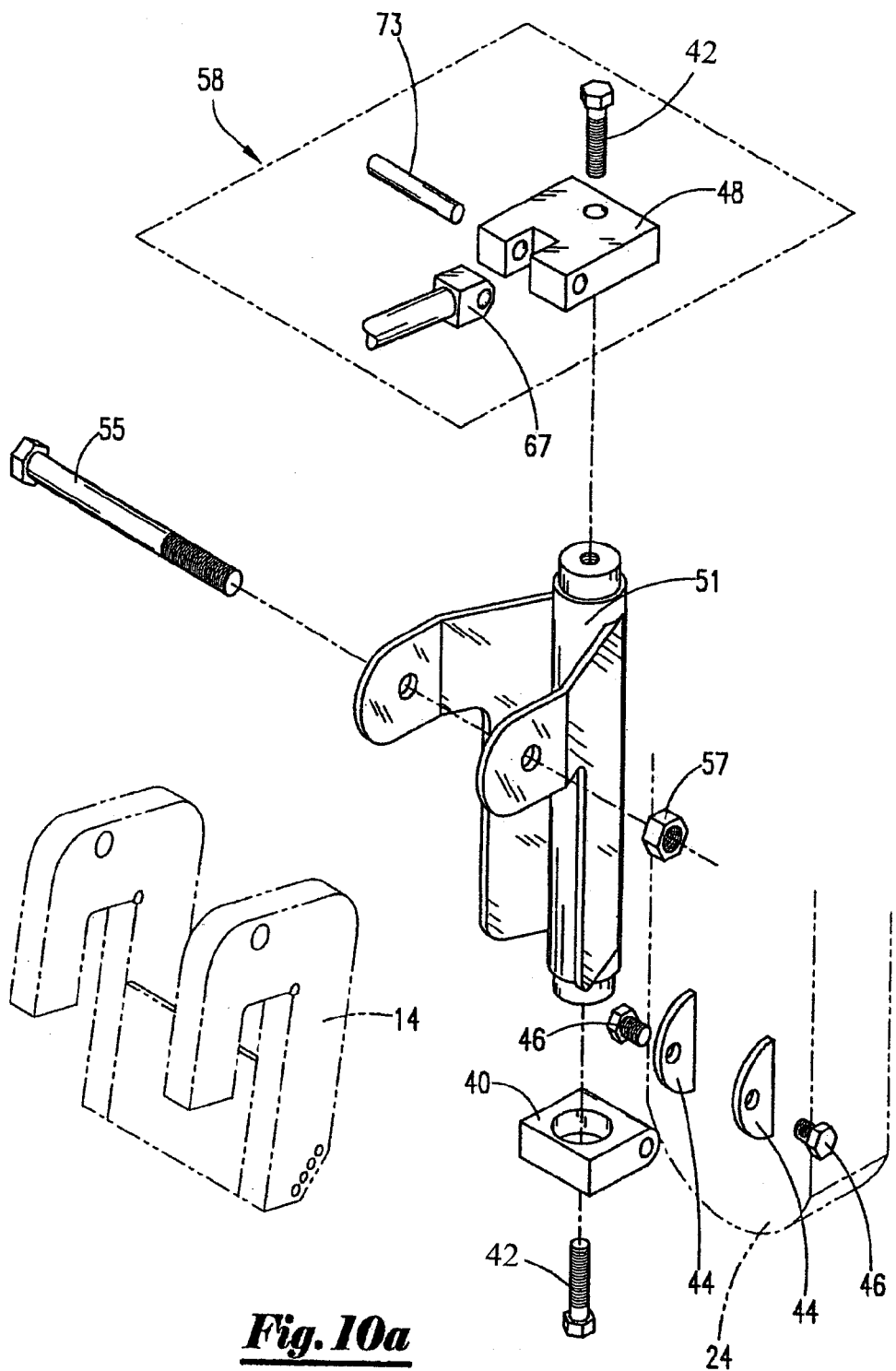
FIG. 10a is an exploded view of the pivotal assembly with manual positioning connection.

As shown in FIG. 5 and in more detail in FIGS. 9 and 10a an upper pintle block 48 is secured to the pintle assembly 28 in a rotative manner about and by the rod 42. The upper block 48 further includes the spreader plate 50 secured within the frame 20 by a pin 52 extending through slots 54 on each side of the frame 20 thus allowing the frame 20 to be pivotal relative to the pintle assembly 28.

As shown in FIG. 10 the pintle assembly 28 (also referenced herein as the "pivotal assembly") further includes a second pivoting assembly formed by the pintle sleeve assembly 51 that is pivotally connected to the transom bracket 14 and rotational about pintle pivot pin 55 secured by a fastener such as a nut 57. Further, the spreader plate 50 is pivotally secured to the pintle block 69 by a set of studs 59 when used with the manual positioner assembly 70 shown in FIGS. 8 and 9. However, an upper pintle block 48 is used in combination with rod clevis 67 pin 73 as seen in FIG. 10a when used with the linear actuator assembly 58 seen in FIG. 5.

Generally, over the transom mud boat drive units are positioned by utilizing the extended handle 56 seen in FIGS. 1, 2 and 3. However, for safety and convenience the ability to pivot the handle as shown in FIG. 3 is a distinct advantage. However, to achieve this an alternative method must be provided for pivotally positioning the drive assembly 12 in the vertical plane while using the handle for positioning in the horizontal plane. Two possible methods are illustrated herein.

The first being a linear actuator assembly 58 seen in FIGS. 1, 2, 3, 4, and 5. The actuator assembly 58 is essentially comprised of an electric motor 60 a gear reducer 62 and a linear positioner 64 as shown in FIG. 5 and better seen in detail in FIG. 10. In this arrangement, the base 66 of the actuator assembly 58 is fixed to the frame 20 while the rod 68 and its rod eye 67 member of the linear positioner 64 is pivotally attached to the pin 52.

As illustrated in FIG. 1 the linear actuator assembly 58, when extended positions the drive shaft housing 26 in a neutral plane whereby the shaft housing is virtually perpendicular to the transom 16. Retraction of the positioner 64 pivots the shaft housing in a negative direction thus forcing the drive shaft 26 and propeller 32 below the bottom hull level 34 as shown in FIG. 2.

Figure 6:
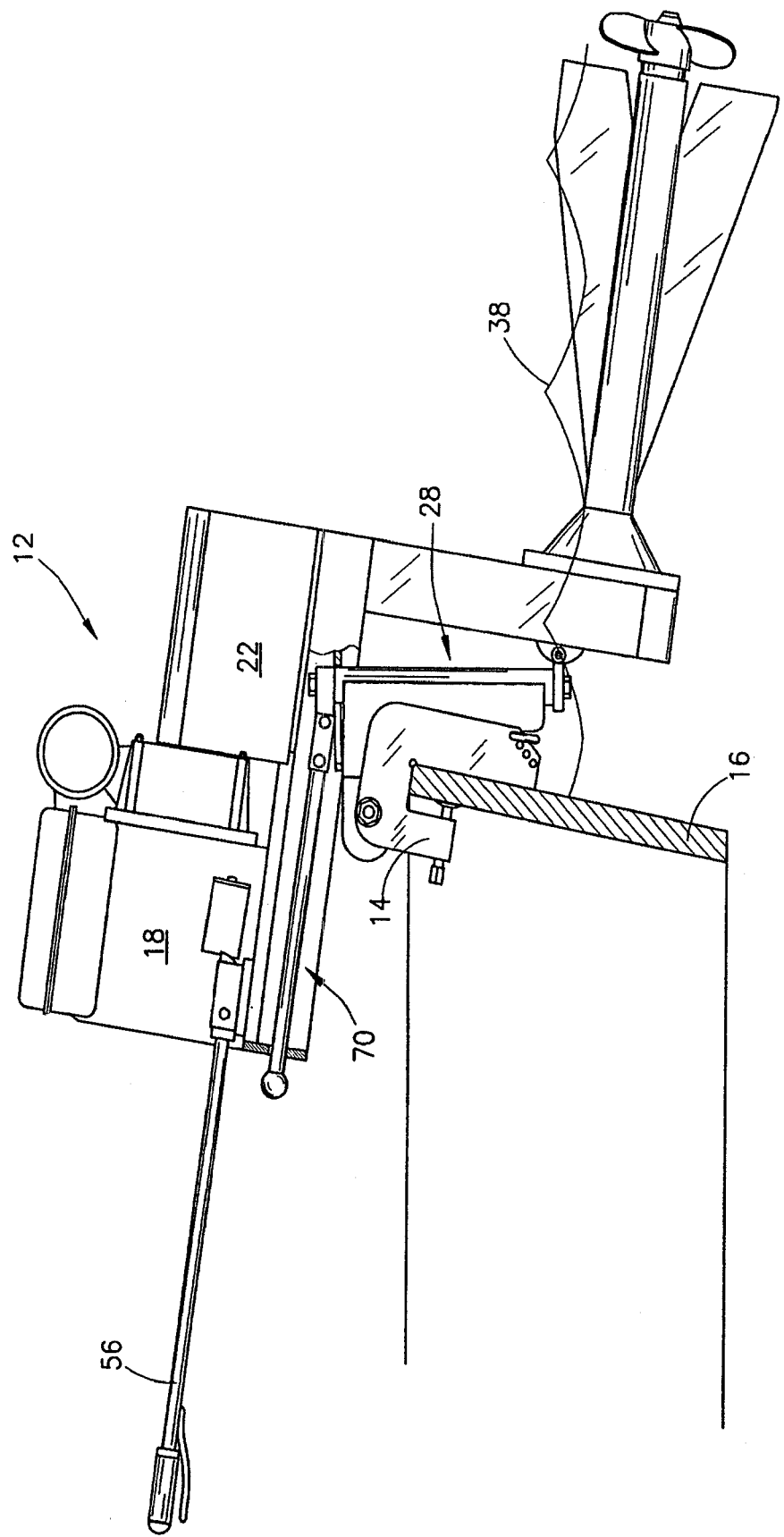
FIG. 6 is a side elevation view of the embodiment with manual positioner in the conventional drive position.
Figure 7:
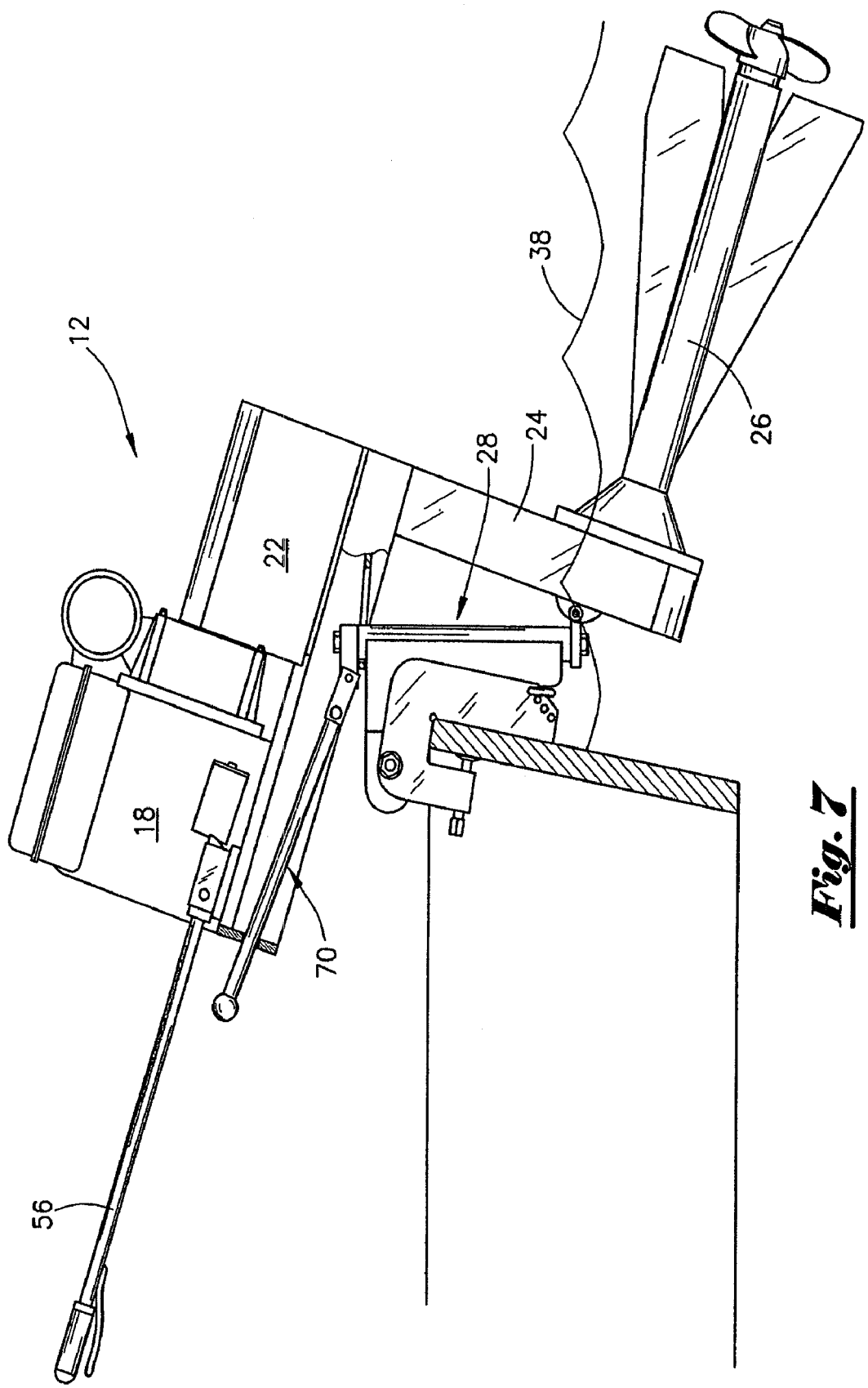
FIG. 7 is a side elevation view of the embodiment with manual positioner in the mud engagement position.

The second positioner being a manual operated locking assembly 70 as shown in FIG. 6, FIG. 7, and FIG. 8 and in detail in FIG. 9. Looking first at FIG. 9 we see that the manually operated locking assembly 70 is simply a lever or handle passing through the frame assembly 20, with a ball 72 at one end and rotatably mounted at the opposite end 74 to the spreader bar pin 52 passing though the frame 20 and spreader plate 50 in a relatively loose manner. A spring 76 provides tension on the handle assembly 70 to insure indentation locking between the series of notches 78 adjacent the ball 72 and an edge of the frame 20.

Looking back at FIG. 6 we see that laterally moving the handle assembly 70 away from the spring 76 releases the frame 20 by moving the notches 78 in the handle away from the frame 20. Therefore; by manually lifting the throttle handle 56 while holding the positioning handle 70 the drive assembly 12 can be easily tilted to a new position as shown in FIG. 7.

Figure 11:
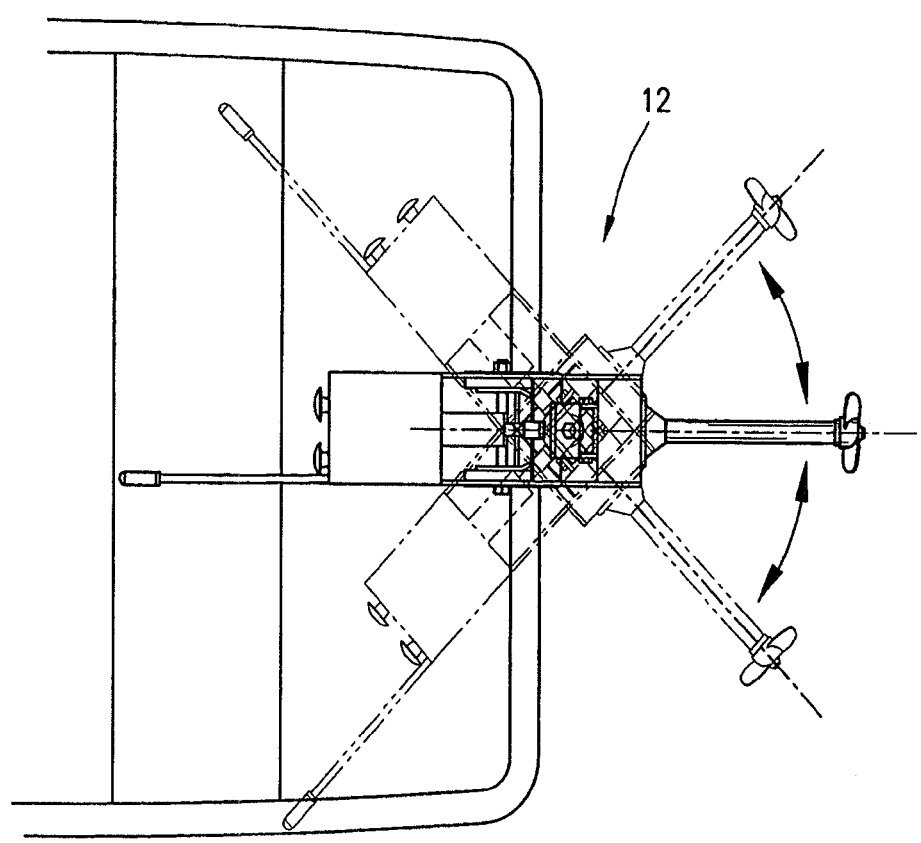
FIG. 11 is a top view of the drive assembly showing rotation in horizontal plane.

As shown in FIG. 11 the overall length of the drive assembly 12 is considerably shorter than that of other drives used for this purpose and has a much smaller turning radius than that used by other mud boat drives.

Figure 12:
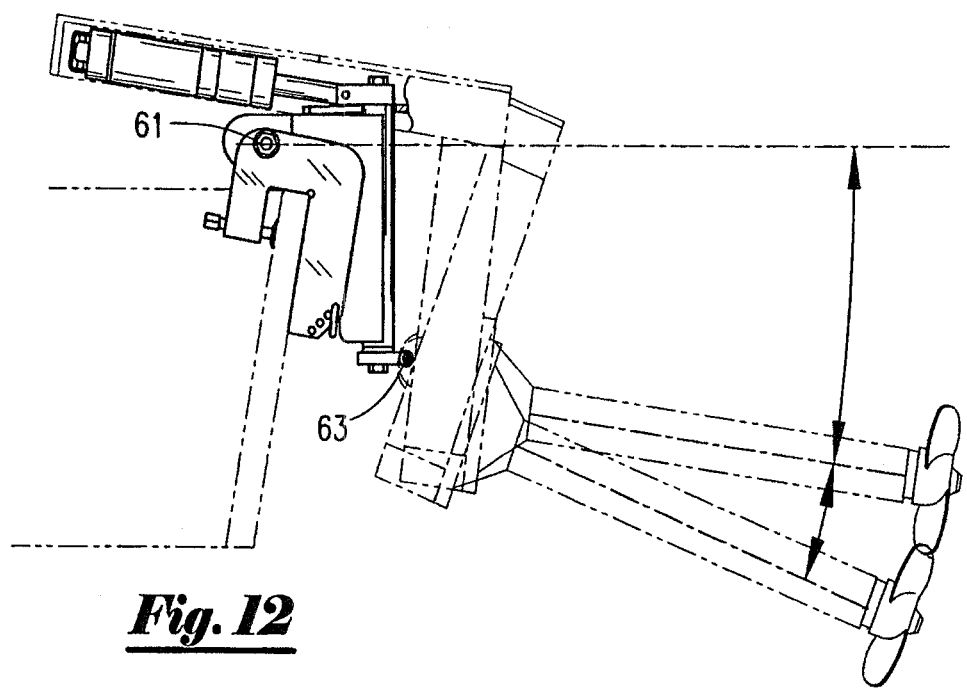
FIG. 12 is side elevation view of the pivoting bracket assembly showing range of motion in the vertical plane.
Figure 13:
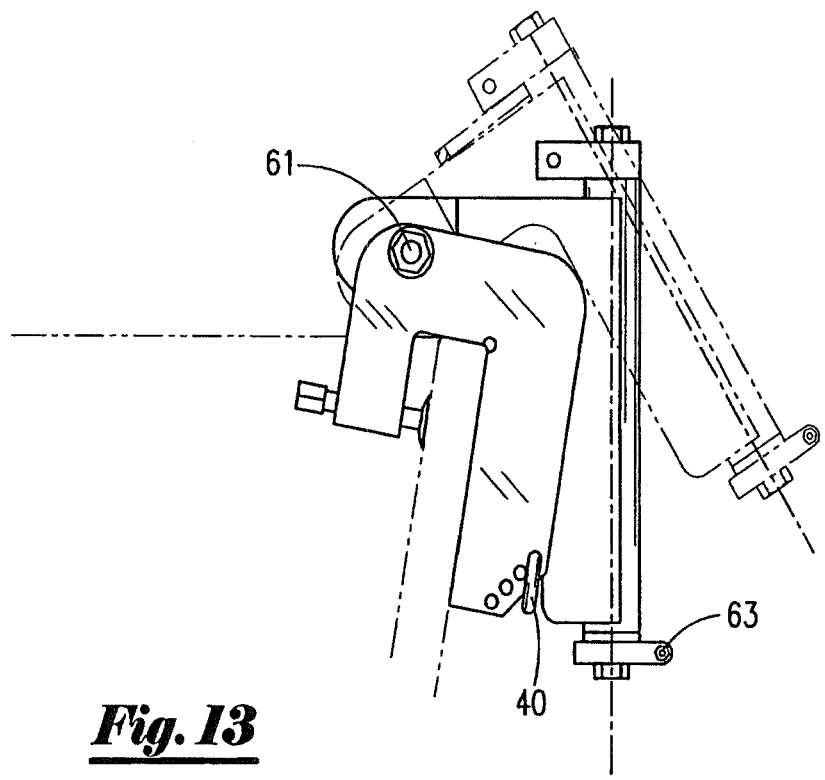
FIG. 13 is side elevation view of the pivoting bracket assembly in the kicked up position in the vertical plane.

It is the dual pivoting provided by a first pivoting assembly at point 63 and the second pivoting assembly at point 61 as again shown in FIGS. 12 and 13 that provides the mounting bracket 14 with dual articulation of the drive 12 and thus allows the propeller 32 to be positioned in both a positive and negative draft angle by positioning the elongated drive housing either positively or negatively beyond vertical relative to the mounting bracket in the vertical plane.

The pivotal handle 56 provides steering and throttle control for the engine assembly 18 and further utilizes a unique locking mechanism 80 that allows the handle to be locked in the down position as shown in FIGS. 1 and 2 and be tilted upwards as shown in FIG. 3.

Figure 14:
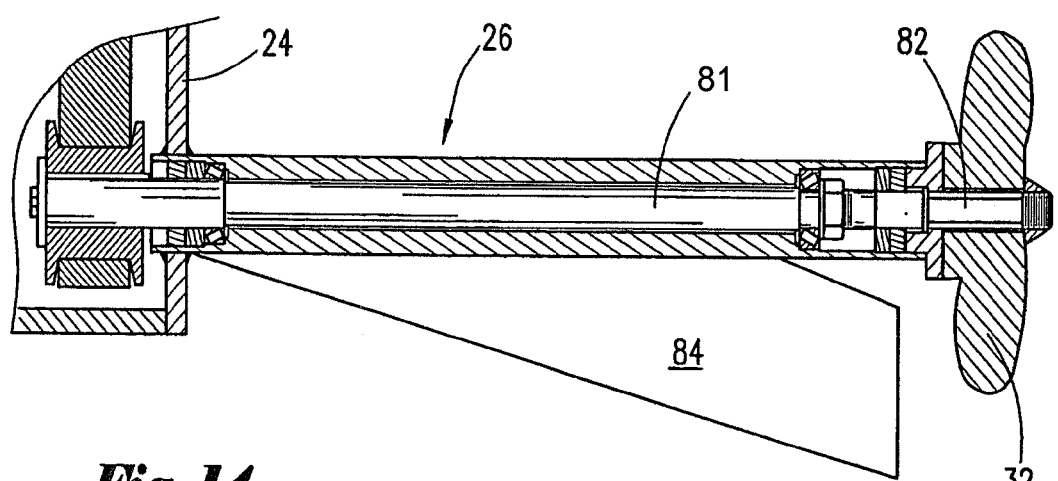
FIG. 14 is a side cross-section view of the drive shaft assembly.
Figure 15:
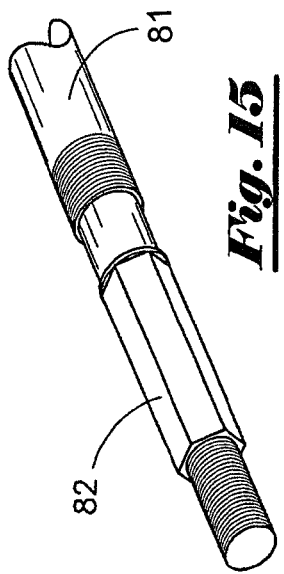
FIG. 15 is a partial isometric view of the drive shaft shown in FIG. 14.

Generally, the propeller 32 is secured to the drive shaft assembly 12 as shown and discussed previously. However, in some cases it has been found that allowing the propeller to slip or shear a pin in the conventional manner to prevent damage to the propeller and or damage to the drive shaft is not acceptable when the propeller is required to engage solid materials such as mud and grass. As illustrated in FIG. 14 and FIG. 15 a more solid connection is recommended. As seen in FIG. 14 the shaft 81 may be modified as shown in FIG. 15 by utilizing a hexagonal shape 82 corresponding to a hexagonal hub located within the propeller 32. This prevents any possibility of shearing as a result of an encounter with immovable objects. However, the lower rutter fin 84 seen in FIG. 14 tends to keep such encounters to a minimum.

Figure 16:
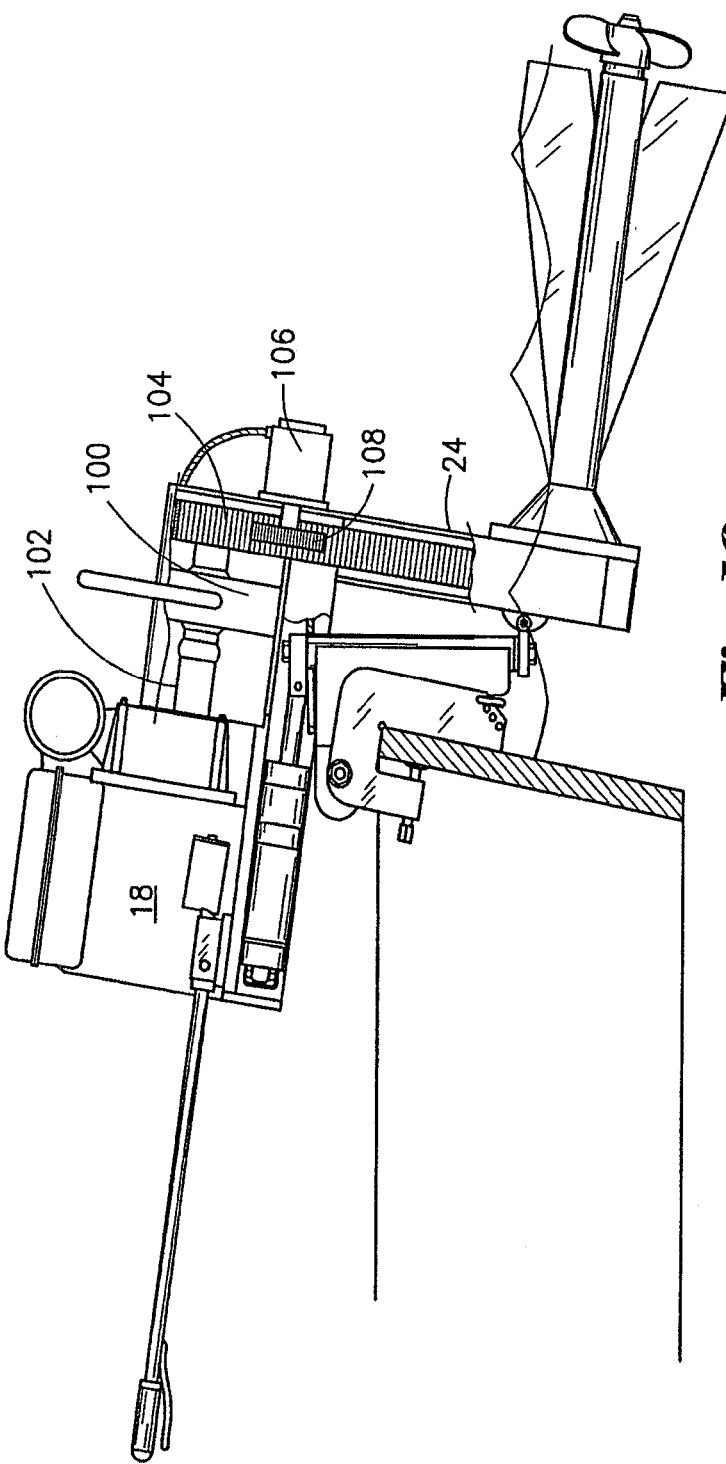
FIG. 16 is side elevation view of the drive assembly showing the reverse drive motor.

Another important aspect of the air-cooled engine outboard drive assembly 12 is shown in FIG. 16. It has been found that in some cases it is advantageous not to use a transmission and simply utilize the high speed of the engine in a 1:1 ratio. However, this precludes the ability to reverse the drive. To still provide reverse capability, a clutch 100 is installed in the driveline between the engine output shaft 102 and the timing belt drive gear 104. A D.C. voltage drive motor 106 is then mounted externally to the drive belt housing 24 with a gear 108 meshing with the belt drive gear 104. This arrangement allows the belt drive gear 104 to be put into a neutral state when the clutch 100 is in engaged thus allowing the drive motor 106 to turn the belt drive in either direction as needed.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

The invention claimed is:

1. A marine craft comprising
    a hull comprising a transom; and
    a portable drive assembly temporarily attached to the transom, the portable drive assembly comprising
        an elongated drive housing enclosing an upper drive assembly and a lower driven assembly and a timing belt connecting the upper drive assembly to the lower driven assembly; and
        an engine mounting plate attached externally to the drive housing adjacent the upper drive assembly perpendicular to the drive housing;
    wherein the lower driven assembly comprises a propeller shaft at least a portion of which is enclosed within a shaft housing attached to the drive housing adjacent the driven assembly, the shaft housing extending in excess of 18 inches beyond the drive housing, and a propeller attached to the propeller shaft.

2. The marine craft according to claim 1, wherein the portable drive assembly further comprises a transmission mounted to the engine mounting plate coupled externally to the upper drive assembly.

3. The marine craft according to claim 1, wherein the portable drive assembly further comprises steering and throttle controls.

4. The marine craft according to claim 1, wherein the shaft housing comprises a rudder fin.

5. The marine craft according to claim 1, wherein the upper drive assembly and the lower driven assembly further include respective timing pulleys compatible with the timing belt, the timing belt being unobstructed or acted upon by other bodies.

6. The marine craft according to claim 1, further comprising a mounting bracket assembly for temporarily attaching the portable drive assembly to the transom, the mounting bracket assembly comprising a mounting bracket and a pivotal assembly for positioning the portable drive assembly in the horizontal plane.

7. The marine craft according to claim 1 further comprising a utility engine mounted on the engine mounting plate and coupled to the upper drive assembly.

8. The marine craft according to claim 7, wherein the portable drive assembly further comprises a transmission mounted to the engine mounting plate coupled externally to the upper drive assembly.

9. The marine craft according to claim 7, wherein the portable drive assembly further comprises steering and throttle controls.

10. The marine craft according to claim 7, wherein the shaft housing comprises a rudder fin.

11. The marine craft according to claim 7, wherein the upper drive assembly and the lower driven assembly further include respective timing pulleys compatible with the timing belt, the timing belt being unobstructed or acted upon by other bodies.

12. The marine craft according to claim 7, further comprising a mounting bracket assembly for temporarily attaching the portable drive assembly to the transom, the mounting bracket assembly comprising a mounting bracket and a pivotal assembly for positioning the portable drive assembly in the horizontal plane.

13. The marine craft according to claim 12, further comprising
a first pivoting assembly for positively positioning the elongated drive housing beyond vertical relative to the mounting bracket in the vertical plane.

14. The marine craft according to claim 13, further comprising
a second pivoting assembly for negatively positioning the elongated drive housing beyond vertical relative to the mounting bracket in the vertical plane.

15. The marine craft according to claim 6, further comprising
a first pivoting assembly for positively positioning the elongated drive housing beyond vertical relative to the mounting bracket in the vertical plane.

16. The marine craft according to claim 15, further comprising
a second pivoting assembly for negatively positioning the elongated drive housing beyond vertical relative to the mounting bracket in the vertical plane.

* * * * *

(12) EX PARTE REEXAMINATION CERTIFICATE (7902nd)
United States Patent
Broussard

(10) Number: US 7,297,035 C1
(45) Certificate Issued: Nov. 30, 2010

(54) MARINE CRAFT ADAPTED FOR SHALLOW WATER OPERATION

(75) Inventor: Kyle Broussard, Loreauville, LA (US)

(73) Assignee: Gator Tail, LLC, Loreauville, LA (US)

Reexamination Request:
No. 90/009,640, Nov. 20, 2009

Reexamination Certificate for:
Patent No.: 7,297,035
Issued: Nov. 20, 2007
Appl. No.: 11/419,669
Filed: May 22, 2006

Related U.S. Application Data

(63) Continuation of application No. 10/844,192, filed on May 11, 2004, now Pat. No. 7,048,600, which is a continuation-in-part of application No. 10/662,487, filed on Sep. 15, 2003, now Pat. No. 7,052,340.

(60) Provisional application No. 60/411,701, filed on Sep. 17, 2002.

(51) Int. Cl.
*B63H 20/14* (2006.01)

(52) U.S. Cl. .......................................................... 440/75
(58) Field of Classification Search ...................... 440/75
See application file for complete search history.

(56) References Cited

U.S. PATENT DOCUMENTS

| | | |
|---|---|---|
| 965,870 A | 8/1910 | Casaday |
| 1,252,360 A | 1/1918 | Moore |
| 2,521,368 A | 9/1950 | Hingerty, Jr. |
| 3,933,116 A | 1/1976 | Adams et al. |
| 3,943,790 A | 3/1976 | Meyer |
| 3,951,096 A | 4/1976 | Dunlap |
| 3,989,000 A | 11/1976 | Foley, Jr. |
| 4,676,756 A | 6/1987 | Rodrigue et al. |
| 4,728,308 A | 3/1988 | Weismann |
| 4,765,075 A | 8/1988 | Nakase et al. |
| 4,813,898 A | 3/1989 | Nakase et al. |
| 4,826,459 A | 5/1989 | Slattery |
| 4,832,638 A | 5/1989 | Sirois |
| 4,854,903 A | 8/1989 | Sirois |
| 4,869,692 A | 9/1989 | Newman |
| 4,946,410 A | 8/1990 | Haman |
| 4,981,452 A | 1/1991 | Grinde |
| 4,992,066 A | 2/1991 | Watson |
| 5,017,090 A | 5/1991 | Morrison |
| 5,102,358 A | 4/1992 | Binversie et al. |
| 5,188,548 A | 2/1993 | Ferguson et al. |
| 5,741,165 A | 4/1998 | Saito et al. |
| 5,911,607 A | 6/1999 | Lacko et al. |
| 5,931,710 A | 8/1999 | Johnson, Sr. |
| 6,139,380 A | 10/2000 | Uematsu |
| 6,213,822 B1 | 4/2001 | Saito et al. |
| 6,234,854 B1 | 5/2001 | Rydzewski |
| 6,309,265 B1 | 10/2001 | Oguma |
| 6,361,388 B2 | 3/2002 | Foreman |

(Continued)

FOREIGN PATENT DOCUMENTS

| | | |
|---|---|---|
| CA | 1172111 | 8/1984 |
| GB | 843633 | 8/1960 |
| GB | 1032427 | 6/1966 |

OTHER PUBLICATIONS

Author Unknown, Mariner Outboards Service Manual, Brunswick Corporation; 1995. (3 pages).

*Primary Examiner*—Jeanne M Clark

(57) ABSTRACT

A marine craft which includes a portable drive assembly temporarily attached to the transom, the portable drive assembly including an elongated drive housing enclosing an upper drive assembly and a lower driven assembly and a timing belt connecting the upper drive assembly to the lower driven assembly. The craft further includes an engine mounting plate attached externally to the drive housing adjacent the upper drive assembly perpendicular to the drive housing. The lower driven assembly also has a propeller shaft at least a portion of which is enclosed within a shaft housing attached to the drive housing adjacent the driven assembly, the shaft housing extending in excess of 18 inches beyond the drive housing, and a propeller attached to the propeller shaft.

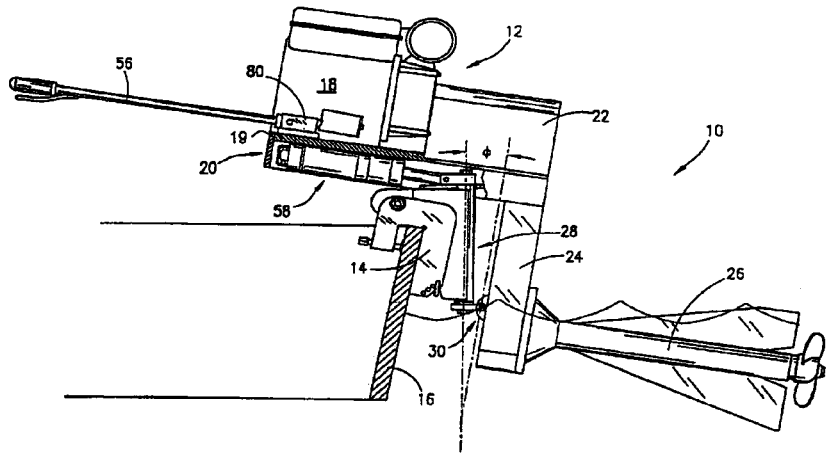

U.S. PATENT DOCUMENTS

| | | |
|---|---|---|
| 6,921,305 B2 | 7/2005 | Provost |
| 7,662,005 B2 | 2/2010 | Provost |
| 2003/0013358 A1 | 1/2003 | Saito |
| 2009/0191774 A1 | 7/2009 | Provost |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16 is confirmed.

New claim 17 is added and determined to be patentable.

*17. The marine craft according to claim 1 wherein the drive housing extends to a position above or approximately flush with the bottom of the boat at the transom.*

\* \* \* \* \*